United States Patent
Correia et al.

(10) Patent No.: US 6,977,983 B2
(45) Date of Patent: *Dec. 20, 2005

(54) NUCLEAR POWER PLANT AND A METHOD OF CONDITIONING ITS POWER GENERATION CIRCUIT

(75) Inventors: Michael Correia, Moreleta Park (ZA); Willem Adriaan Odendaal Kriel, Moreleta Park (ZA)

(73) Assignee: Pebble Bed Modular Reactor (Pty) Ltd., Centurion (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 10/473,452

(22) PCT Filed: Mar. 27, 2002

(86) PCT No.: PCT/IB02/00947

§ 371 (c)(1),
(2), (4) Date: Apr. 5, 2004

(87) PCT Pub. No.: WO02/080189

PCT Pub. Date: Oct. 10, 2002

(65) Prior Publication Data

US 2004/0196951 A1 Oct. 7, 2004

(30) Foreign Application Priority Data

Mar. 30, 2001 (ZA) .................................. 2001/2646

(51) Int. Cl.[7] .............................................. G21C 3/56
(52) U.S. Cl. .................... 376/383; 376/381; 376/331; 376/391
(58) Field of Search ............................... 376/383, 381, 376/331, 391

(56) References Cited

U.S. PATENT DOCUMENTS

| 3,210,254 A | 10/1965 | Fortescue |
| 4,052,260 A | 10/1977 | Forster et al. |

FOREIGN PATENT DOCUMENTS

| GB | 1362902 | 1/1972 |
| JP | 2000154733 | 6/2000 |
| WO | WO 02/21537 A2 | 3/2002 |

*Primary Examiner*—Jack Keith
*Assistant Examiner*—Rick Palabrica
(74) *Attorney, Agent, or Firm*—Senniger Powers

(57) ABSTRACT

In a nuclear power plant making use of a high temperature gas cooled reactor, it is necessary, prior to commencing power generation and connection of a generator to an electrical distribution grid, to condition the power generation circuit of the plant. This involves creating stable conditions within the power generation circuit. To this end, the plant includes a start-up blower system for circulating working fluid, typically helium, around the power generation circuit until the desired conditions are satisfied. The start-up blower system typically includes a normally open in-line valve, at least one blower connected in parallel with the in-line valve and a normally closed isolation valve connected in series with the blower. Conditioning the power generation circuit will typically include stabilizing the pressure in the circuit at between 10 bar and 50 bar.

9 Claims, 1 Drawing Sheet

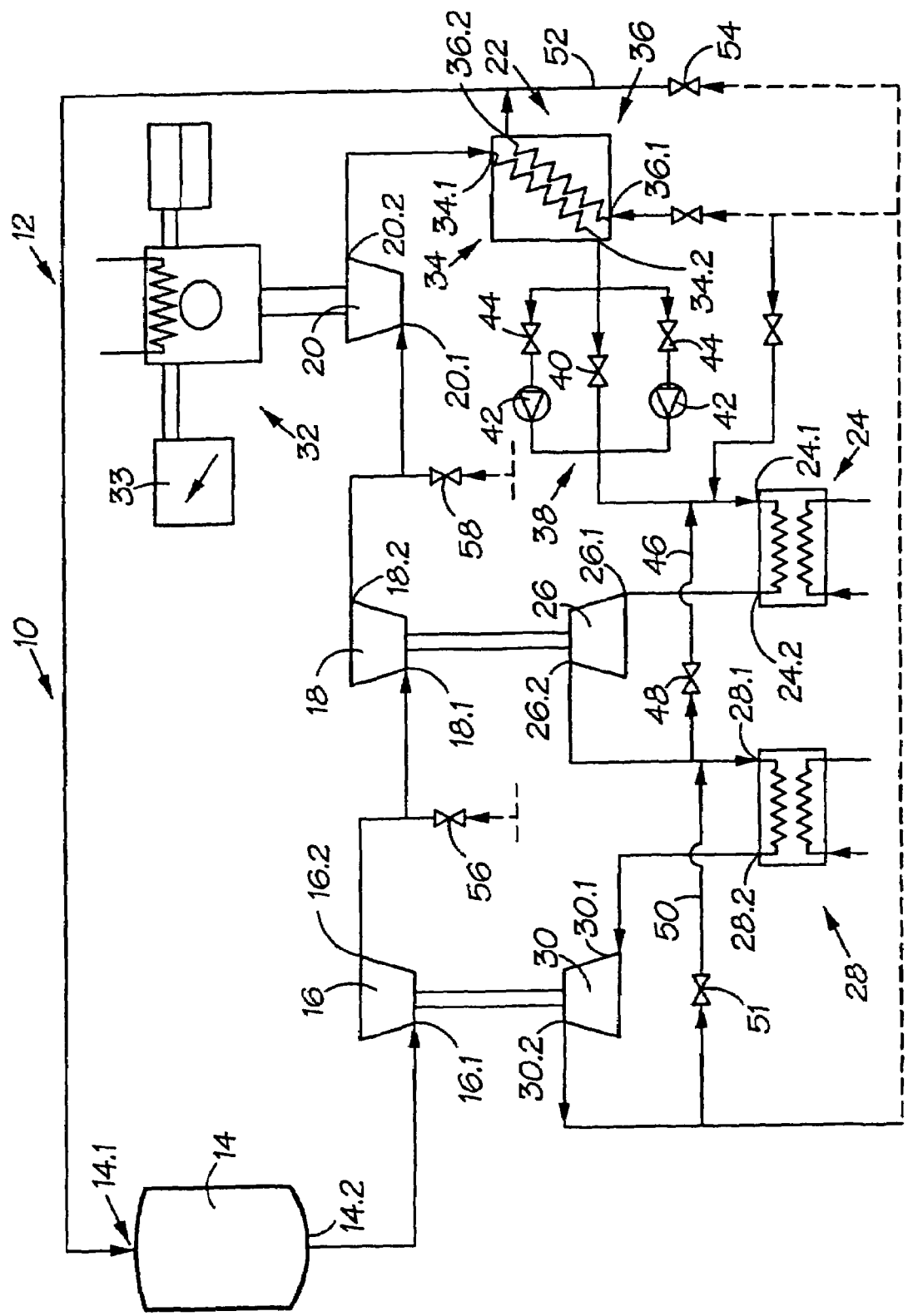

NUCLEAR POWER PLANT AND A METHOD OF CONDITIONING ITS POWER GENERATION CIRCUIT

THIS INVENTION relates to a nuclear power plant. It also relates to a method of conditioning the power generation circuit of a nuclear power plant.

According to one aspect of the invention there is provided a nuclear power plant which includes a closed loop power generation circuit making use of gas as a working fluid; and a start-up blower system for conditioning the power generation circuit.

Typically the working fluid is helium.

The power generation circuit may include a nuclear reactor having a working fluid inlet and a working fluid outlet, a turbine arrangement, an upstream side of which is connected to the outlet of the reactor, at least one compressor and at least one heat exchanger, the plant further including a generator to which the turbine arrangement is drivingly connected; and a variable resistor bank which is disconnectably connectable to the generator.

The turbine arrangement may include a high pressure turbine drivingly connected to a high pressure compressor, a low pressure turbine drivingly connected to a low pressure compressor and a power turbine drivingly connected to the generator.

The power generation circuit may includes a recuperator which has a high pressure side and a low pressure side, each side of the recuperator having an inlet and an outlet, a pre-cooler connected between an outlet of the low pressure side of the recuperator and an inlet of the low pressure compressor and an inter-cooler connected between an outlet of the low pressure compressor and an inlet of the high pressure compressor, the start-up blower system being positioned between the outlet of the low pressure side of the recuperator and an inlet of the pre-cooler.

The power generation circuit may include a low pressure recirculation line in which a low pressure recirculation valve is mounted, the low pressure recirculation line extending from a position between the outlet of the low pressure compressor and an inlet of the inter-cooler to a position between the start-up blower system and the inlet of the pre-cooler.

The power generation circuit may include a high pressure recirculation line in which a high pressure recirculation valve is mounted, the line extending from a position between an outlet of the high pressure compressor and the inlet of the high pressure side of the recuperator to a position between the outlet of the low pressure compressor and an inlet of the inter-cooler.

The power generation circuit may include a recuperator bypass line in which a recuperator bypass valve is mounted, the bypass line extending from a position upstream of the inlet of the high pressure side of the recuperator to a position downstream of the outlet of the high pressure side of the recuperator.

The power generation circuit may further include a high pressure coolant valve and a low pressure coolant valve, the high pressure coolant valve being configured, when open, to provide a bypass of helium from the high pressure side of the high pressure compressor to the inlet of the low pressure turbine, the low pressure coolant valve being configured to provide a bypass of helium from the high pressure side of the high pressure compressor to the inlet of the power turbine.

The start-up blower system may include, in parallel, a start-up blower and a normally open start-up blower system in-line valve which valve is connected in series between the low pressure side of the recuperator and the pre-cooler.

Preferably the start-up blower system includes two blowers connected in parallel and a normally closed isolation valve associated with each blower.

The nuclear reactor may be a high temperature helium cooled pebble bed reactor making use of spherical fuel elements.

To bring the nuclear power plant into a standby mode ready for power operation and connection to the grid, stable conditions must be created in the power generation circuit, this is referred to as conditioning of the power generation circuit.

According to another aspect of the invention, in a nuclear power plant which includes a closed loop power generation circuit there is provided a method of conditioning the power generation circuit which include the step of circulating helium around the power generation circuit by means of a start-up blower system.

The start-up blower system may have a normally open start-up blower system in-line valve, at least one blower connected in parallel with the start-up blower system in-line valve and a normally closed isolation valve connected in series with the or each blower, and the method may include the steps of closing the start-up blower system in-line valve;

opening the or each isolation valve; and operating the or each blower to circulate helium around the power generation circuit.

The method may include stabilizing the pressure in the power generation circuit at a pressure between 10 bar and 50 bar.

When the plant is configured, during normal operation, to use a Brayton cycle as the thermodynamic conversion cycle, and the power generation circuit includes a high pressure compressor, a low pressure compressor, a high pressure recirculation line, whereby helium can be recirculated around the high pressure compressor, a low pressure recirculation line whereby helium can be recirculated around the low pressure compressor and a high pressure recirculation valve and a low pressure recirculation valve for regulating the flow of helium through the high pressure recirculation line and low pressure recirculation line, respectively, in order to prevent premature starting of the Brayton cycle, the method may include the step of opening at least one and preferably both of the high and low pressure recirculation valves.

The method may include regulating the temperature of gas entering the start-up blower system thereby to reduce the risk of damage to the start-up blower system.

The method may include restricting the outlet temperature of the start-up blower system to a temperature below a predetermined value, typically a temperature of not greater than 250° C.

When the power generation circuit includes a recuperator having a high pressure side and a low pressure side, the method may include the step of regulating the temperature of the helium entering the recuperator.

The method may include limiting the temperature of helium entering the recuperator to a temperature not higher than 600° C.

When the plant includes a recuperator by-pass line configured to permit helium to by-pass the high pressure side of the recuperator and a recuperator by-pass valve for regulating the flow of helium through the recuperator by-pass line, regulating the temperature of helium entering the recuperator may include operating the recuperator by-pass valve to regulate the flow of helium through the recuperator.

When the power generation circuit includes a high pressure coolant valve and a low pressure coolant valve which are configured, when opened, to provide a by-pass of helium from the high pressure side of the high pressure compressor to the inlet of the low pressure turbine and from the high pressure side of the high pressure compressor to the inlet of the power turbine, regulating the temperature of helium entering the recuperator may include operating at least one of the high pressure coolant valve and the low pressure coolant valve.

The method may include operating the recuperator bypass valve in order to regulate the reactor inlet temperature and control the temperature of the start-up blower system. Operating the recuperator bypass valve enables also the coolers in the system to remove the heat generated in the core more effectively. Preferably, the recuperator bypass valve is operated to keep the outlet temperature of the start-up blower system below a predetermined value, typically 250° C.

When the plant includes a power turbine drivingly connected to a generator the method may include the step of stabilizing and controlling the speed of the power turbine.

Stabilizing and controlling the speed of the power turbine may be achieved by varying the load on the generator.

The method may include varying the electrical load on the generator by means of a variable resistor bank.

The invention will now be described, by way of example, with reference to the accompanying diagrammatic drawing which shows a schematic representation of a nuclear power plant in accordance with the invention.

In the drawing, reference numeral 10 refers generally to part of a nuclear power plant in accordance with the invention.

The nuclear power plant 10 includes a closed loop power generation circuit, generally indicated by reference numeral 12. The power generation circuit 12 includes a nuclear reactor 14, a high pressure turbine 16, a low pressure turbine 18, a power turbine 20, a recuperator 22, a pre-cooler 24, a low pressure compressor 26, an inter-cooler 28 and a high pressure compressor 30.

The reactor 14 is a pebble bed reactor making use of spherical fuel elements. The reactor 14 has a helium inlet 14.1 and a helium outlet 14.2.

The high pressure turbine 16 is drivingly connected to the high pressure compressor 30 and has an upstream side or inlet 16.1 and a downstream side or outlet 16.2, the inlet 16.1 being connected to the outlet 14.2 of the reactor 14.

The low pressure turbine 18 is drivingly connected to the low pressure compressor 26 and has an upstream side or inlet 18.1 and a downstream side or outlet 18.2. The inlet 18.1 is connected to the outlet 16.2 of the high pressure turbine 16.

The nuclear power plant 10 includes a generator, generally indicated by reference numeral 32 to which the power turbine 20 is drivingly connected. The power turbine 20 includes an upstream side or inlet 20.1 and a downstream side or outlet 20.2. The inlet 20.1 of the power turbine 20 is connected to the outlet 18.2 of the low pressure turbine 18.

A variable resistor bank 33 is disconnectably connectable to the generator 32.

The recuperator 22 has a hot or low pressure side 34 and a cold or high pressure side 36. The low pressure side of the recuperator 34 has an inlet 34.1 and an outlet 34.2. The inlet 34.1 of the low pressure side is connected to the outlet 20.2 of the power turbine 20.

The pre-cooler 24 is a helium to water heat exchanger and includes a helium inlet 24.1 and a helium outlet 24.2. The inlet 24.1 of the pre-cooler 24 is connected to the outlet 34.2 of the low pressure side 34 of the recuperator 22.

The low pressure compressor 26 has an upstream side or inlet 26.1 and a downstream side or outlet 26.2. The inlet 26.1 of the low pressure compressor 26 is connected to the helium outlet 24.2 of the pre-cooler 24.

The inter-cooler 28 is a helium to water heat exchanger and includes a helium inlet 28.1 and a helium outlet 28.2. The helium inlet 28.1 is connected to the outlet 26.2 of the low pressure compressor 26.

The high pressure compressor 30 includes an upstream side or inlet 30.1 and a downstream side or outlet 30.2. The inlet 30.1 of the high pressure compressor 30 is connected to the helium outlet 28.2 of the inter-cooler 28. The outlet 30.2 of the high pressure compressor 30 is connected to an inlet 36.1 of the high pressure side of the recuperator 22. An outlet 36.2 of the high pressure side of the recuperator 22 is connected to the inlet 14.1 of the reactor 14.

The nuclear power plant 10 includes a start-up blower system generally indicated by reference numeral 38 connected between the outlet 34.2 of the low pressure side 34 of the recuperator 22 and the inlet 24.1 of the pre-cooler 24.

The start-up blower system 38 includes a normally open start-up blower system in-line valve 40 which is connected in-line between the outlet 34.2 of the low pressure side of the recuperator and the inlet 24.1 of the pre-cooler 24. Two blowers 42 are connected in parallel with the start-up blower system in-line valve 40 and a normally closed isolation valve 44 is associated with and connected in series with each blower 42.

A low pressure compressor recirculation line 46 extends from a position between the outlet or downstream side 26.2 of the low pressure compressor 26 and the inlet 28.1 of the inter-cooler 28 to a position between the start-up blower system 38 and the inlet 24.1 of the pre-cooler 24. A normally closed low pressure recirculation valve 48 is mounted in the low pressure compressor recirculation line 46.

A high pressure compressor recirculation line 50 extends from a position between the outlet or downstream side 30.2 of the high pressure compressor and the inlet 36.1 of the high pressure side 36 of the recuperator 22 to a position between the outlet or downstream side 26.2 of the low pressure compressor 26 and the inlet 28.1 of the inter-cooler 28. A normally closed high pressure recirculation valve 51 is mounted in the high pressure compressor recirculation line 50.

A recuperator bypass line 52 extends from a position upstream of the inlet 36.1 of the high pressure side 36 of the recuperator 22 to a position downstream of the outlet 36.2 of the high pressure side 36 of the recuperator 22. A normally closed recuperator bypass valve 54 is mounted in the recuperator bypass line 52.

The plant 10 includes a high pressure coolant valve 56 and a low pressure coolant valve 58. The high pressure coolant valve 56 is configured, when open, to provide a bypass of helium from the high pressure side or outlet 30.2 of the high pressure compressor 30 to the inlet or low pressure side 18.1 of the low pressure turbine 18. The low pressure coolant valve 58 is configured, when open, to provide a bypass of helium from the high pressure side or outlet 30.2 of the high pressure compressor 30 to the inlet 20.1 of the power turbine 20.

To bring the nuclear power plant 10 from a standby mode to a power operation mode, stable thermodynamic conditions should be created in the power generation circuit 12. This is referred to as conditioning of the power generation circuit for power operation.

In use, in order to condition the power generation circuit for the power operation mode, the procedure to start the start-up blower system is executed. More particularly, the start-up blower in-line valve 40 is closed. Each of the isolation valves 44 is opened and the blowers 42 are operated to stabilise the mass flow in the power generation circuit.

The power generation circuit 12 is configured to make use of a Brayton cycle as the thermodynamic conversion cycle and in order to prevent premature starting of the Brayton cycle, the high and low pressure compressor recirculation valves 48, 51 are opened.

The position of the recuperator bypass valve 54 and the speed of the blowers 42 are controlled to regulate the conditioning temperature in the reactor.

In order to reduce the risk of damage to the blowers 42 it is important that the maximum temperatures in the blowers be maintained below a predetermined maximum temperature, typically 250° C. In this regard, the recuperator bypass valve 54 is operated which controls the core inlet temperature and so indirectly the maximum temperature in the start-up blower system 38.

Further, in order to regulate the maximum temperature in the recuperator 22, one or both of the high pressure coolant bypass valve 56 and low pressure coolant bypass valve 58 are operated in order to ensure that the maximum temperature in the recuperator remains below a predetermined maximum temperature, typically 600° C.

When stable conditions are achieved in the power generation circuit 12, the nuclear power plant 10 is in power operation mode, ready for power production and connection to the grid.

What is claimed is:

1. A nuclear power plant which includes
a closed loop power generation circuit making use of gas as a working fluid, the power generation circuit including a nuclear reactor having a working fluid inlet and a working fluid outlet, a high pressure turbine drivingly connected to a high pressure compressor, a low pressure turbine drivingly connected to a low pressure compressor and a power turbine drivingly connected to a generator, a recuperator which has a high pressure side and a low pressure side, each side of the recuperator having an inlet and an outlet, a pre-cooler connected between an outlet of the low pressure side of the recuperator and an inlet of the low pressure compressor, and an intercooler connected between the outlet of the low pressure compressor and an inlet of the high pressure compressor; and
a start-up blower system for conditioning the power generation circuit, the start-up blower system being positioned between the outlet of the low pressure side of the recuperator and an inlet of the pre-cooler.

2. A plant as claimed in claim 1, in which the power generation circuit includes a low pressure recirculation line in which a low pressure recirculation valve is mounted, the low pressure recirculation line extending from a position between the outlet of the low pressure compressor and an inlet of the inter-cooler to a position between the start-up blower system and the inlet of the pre-cooler and a high pressure recirculation line in which a high pressure recirculation valve is mounted, the line extending from a position between an outlet of the high pressure compressor and the inlet of the high pressure side of the recuperator to a position between the outlet of the low pressure compressor and an inlet of the inter-cooler.

3. A plant as claimed in claim 2, in which the power generation circuit includes a recuperator bypass line in which a recuperator bypass valve is mounted, the bypass line extending from a position upstream of the inlet of the high pressure side of the recuperator to a position downstream of the outlet of the high pressure side of the recuperator.

4. A plant as claimed in claim 2, in which the power generation circuit further includes a high pressure coolant valve and a low pressure coolant valve, the high pressure coolant valve being configured, when open, to provide a bypass of working fluid from a high pressure side of the high pressure compressor to the inlet of the low pressure turbine, the low pressure coolant valve being configured to provide a bypass of helium from the high pressure side of the high pressure compressor to the inlet of the power turbine.

5. A plant as claimed in claim 2, in which the start-up blower system includes, in parallel, a start-up blower and a normally open start-up blower system in-line valve which valve is connected in series between the low pressure side of the recuperator and the pre-cooler.

6. A plant as claimed in claim 5, in which the start-up blower system includes two blowers connected in parallel and a normally closed isolation valve associated with each blower.

7. A plant as claimed in claim 1, in which the nuclear reactor is a high temperature helium cooled pebble bed reactor making use of spherical fuel elements.

8. A plant as claimed in claim 1, in which the start-up blower system has a normally open start-up blower system in-line valve, at least one blower connected in parallel with the start-up blower system in-line valve and a normally closed isolation valve connected in series with the or each blower.

9. A plant as claimed in claim 1, which includes a variable resistor bank which is disconnectably connectable to the generator.

* * * * *